United States Patent
Mori et al.

(10) Patent No.: US 10,132,342 B2
(45) Date of Patent: Nov. 20, 2018

(54) FASTENING STRUCTURE FOR CARBON FIBER-REINFORCED RESIN MATERIAL

(71) Applicant: Nissan Motor Co., Ltd., Yokohama-shi, Kanagawa (JP)

(72) Inventors: Masatoshi Mori, Kanagawa (JP); Hiroshi Ookubo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/539,766

(22) PCT Filed: Jan. 22, 2015

(86) PCT No.: PCT/JP2015/051608
§ 371 (c)(1),
(2) Date: Jun. 26, 2017

(87) PCT Pub. No.: WO2016/117062
PCT Pub. Date: Jul. 28, 2016

(65) Prior Publication Data
US 2018/0266463 A1    Sep. 20, 2018

(51) Int. Cl.
*F16B 5/02* (2006.01)
*B29C 65/00* (2006.01)
(Continued)

(52) U.S. Cl.
CPC ........... *F16B 5/0241* (2013.01); *B29C 65/48* (2013.01); *B29C 65/561* (2013.01);
(Continued)

(58) Field of Classification Search
CPC .......... F16B 5/0241; F16B 2001/0078; B29C 65/561; B29C 65/562; B29C 66/70;
(Continued)

(56) References Cited

U.S. PATENT DOCUMENTS

| 860,829 A | * | 7/1907 | Schmidt | B26B 21/06 30/155 |
| 4,512,699 A | * | 4/1985 | Jackson | F16B 5/02 403/28 |

(Continued)

FOREIGN PATENT DOCUMENTS

| CN | 1268211 A | 9/2000 | |
| DE | 102008037155 A1 | * 2/2010 | E04H 9/021 |

(Continued)

OTHER PUBLICATIONS

Max L. Blosser et al., "Theoretical Basis for Design of Thermal-Stress-Free Fasteners", NASA Technical Paper 2226, Dec. 1983, Retrieved from the Internet: https://ntrs.nasa.gov/archive/nasa/casi.ntrs.nasa.gov/19840005546.pdf, USA.

*Primary Examiner* — Jonathan P Masinick
(74) *Attorney, Agent, or Firm* — Global IP Counsellors, LLP

(57) ABSTRACT

A fastening structure is fastened to an object. The fastening structure includes a carbon fiber-reinforced resin, a metal collar and a fastener. The outer circumference of a metal collar has a tapered portion, which is inclined with respect to the central axis of the collar. The inner circumferential surface of a through hole in a carbon fiber-reinforced resin ("CFRP") material has an abutting portion that contacts the tapered portion of the collar via an electrically insulating adhesive. The tilt angle of the tapered portion of the collar and of the abutting portion of the CFRP material are the same as the angle at which the displacement of the CFRP material in a direction perpendicular to the surface of the abutting portion due to thermal deformation resulting from temperature changes is balanced with the displacement of the collar in a direction perpendicular to the surface of the tapered portion.

4 Claims, 1 Drawing Sheet

(51) Int. Cl.
　　*B29C 65/56*　　(2006.01)
　　*B29C 65/48*　　(2006.01)
　　*F16B 11/00*　　(2006.01)

(52) U.S. Cl.
　　CPC ........ *B29C 65/562* (2013.01); *B29C 66/1122* (2013.01); *B29C 66/1162* (2013.01); *B29C 66/21* (2013.01); *B29C 66/41* (2013.01); *B29C 66/474* (2013.01); *B29C 66/7212* (2013.01); *B29C 66/73112* (2013.01); *B29C 66/742* (2013.01); *F16B 11/006* (2013.01)

(58) Field of Classification Search
　　CPC ..... B29C 66/71; B29C 66/712; B29C 66/721; B29C 66/742; B29C 66/73112
　　See application file for complete search history.

(56) References Cited

U.S. PATENT DOCUMENTS

| | | | |
|---|---|---|---|
| 4,650,385 A | 3/1987 | Jackson et al. | |
| 4,957,403 A * | 9/1990 | Corain | F16B 5/0241 267/162 |
| 5,022,805 A | 6/1991 | Roberts | |
| 6,718,774 B2 * | 4/2004 | Razzell | F01D 25/243 60/753 |
| 7,153,054 B2 * | 12/2006 | Arbona | B62D 29/048 403/28 |
| 8,092,134 B2 | 1/2012 | Oguri et al. | |
| 9,267,531 B2 * | 2/2016 | Revel | F16B 39/02 |
| 9,290,276 B2 * | 3/2016 | Watanabe | B64D 45/02 |
| 9,925,720 B2 * | 3/2018 | Bastos Abibe | B29C 65/645 |
| 2017/0008443 A1 * | 1/2017 | Burton | B60Q 1/0408 |
| 2017/0023038 A1 * | 1/2017 | Izuhara | F16B 5/04 |
| 2018/0216644 A1 * | 8/2018 | Mateo | B64F 5/10 |

FOREIGN PATENT DOCUMENTS

| | | | | |
|---|---|---|---|---|
| DE | 102009035785 A1 * | 3/2010 | ......... B60R 13/0206 |
| DE | 102012112867 A1 * | 6/2014 | ............ F02K 9/343 |
| JP | 3-272828 A | 12/1991 | |
| JP | 11-223164 A | 8/1999 | |
| JP | 2002-36286 A | 2/2002 | |
| JP | 2005330958 A * | 12/2005 | ........... B62D 29/048 |
| JP | 2007-292106 A | 11/2007 | |
| JP | 2007-332980 A | 12/2007 | |
| JP | 2007-332983 A | 12/2007 | |
| JP | 2011-133009 A | 7/2011 | |
| WO | WO-2007025687 A1 * | 3/2007 | .............. F16B 2/243 |
| WO | 2007/142354 A1 | 12/2007 | |
| WO | WO-2009030480 A2 * | 3/2009 | ............ F16B 5/0241 |

* cited by examiner

FASTENING STRUCTURE FOR CARBON FIBER-REINFORCED RESIN MATERIAL

CROSS-REFERENCE TO RELATED APPLICATIONS

This application is a U.S. National stage application of International Application No. PCT/JP2015/051608, filed Jan. 22, 2015.

BACKGROUND

Field of the Invention

The present invention relates to a fastening structure for carbon fiber-reinforced resin (hereinafter referred to as "CRFP") material.

Background Information

Conventionally, a fastening structure for a CFRP material that fastens a CFRP material and an object to be fastened using a fastener is known (for example, see Japanese Laid Open Patent Application No. 2007-292106—Patent Document 1). Patent Document 1 discloses a technique to fasten a CFRP material and a bracket using a bolt and a nut.

Since the resin that configures CFRP undergoes creep deformation when using a high strength bolt as a fastener, there are cases in which a metallic collar is mounted to the CFRP material so that the axial force of the bolt is received by the metallic collar. Accordingly, it is possible to suppress loosening of the bolt caused by a reduction in the axial force of the bolt due to the occurrence, over time, of thinning of the resin material, which constitutes the CFRP material, by creep deformation, or the like.

In such a fastening structure, there is a possibility that liquid (for example rainwater or seawater) may intrude between the CFRP material and the metallic collar, causing electric corrosion of the metallic collar if liquid adheres to the portion where the CFRP material and the metallic collar are in contact. Accordingly, it is preferable to apply an electrically insulating adhesive on the inner circumferential surface of a prepared hole in the CFRP material for mounting the metallic collar, in order to electrically insulate the CFRP material and the metallic collar.

SUMMARY

However, the fastening structure described above has the problem that, depending on the angle of the collar when inserting the metallic collar into the prepared hole provided in the CFRP material, there is the possibility that the adhesive may be squeezed out of the prepared hole letting the outer circumference of the metallic collar come into electrical contact with the inner circumferential surface of the prepared hole provided in the CFRP material.

Therefore, an object of the present invention is to provide a fastening structure for a CFRP material that is capable of suppressing electric corrosion of a metallic collar by suppressing electrical contact between the outer circumference of the metallic collar and the inner circumferential surface of a prepared hole provided in the CFRP material.

In the fastening structure for a CFRP material according to the present invention, the outer circumference of the metallic collar has a tapered portion that is inclined with respect to the center axis of the collar, and the inner circumferential surface of the through-hole in the CFRP material has an abutting portion that contacts the tapered portion of the collar with an electrically insulating adhesive. The angles of the tapered portion of the collar and the abutting portion of the CFRP material are the same as the angle at which the displacement of the CFRP material in a direction perpendicular to the surface of the abutting portion due to thermal deformation accompanying a change, is balanced with the displacement of the collar in the direction perpendicular to the surface of the tapered portion.

It becomes possible to insert a metallic collar into a through-hole without squeezing the adhesive out of the prepared hole (through-hole) provided in the CFRP material, and to suppress electrical contact between the outer circumference of the metallic collar and the inner circumferential surface of the through-hole of the CFRP material. In addition, by setting the tilt angles of the tapered portion and the abutting portion as described above, the vertical distance between the surface of the tapered portion and the surface of the abutting portion is maintained constant even with temperature changes. Accordingly, it becomes possible to suppress damage of the adhesive layer caused by deformation due to a difference in thermal expansion or a difference in thermal contraction between the CFRP material and the metallic collar. Therefore, according to the fastening structure for a CFRP material of the present invention, it is possible to suppress electric corrosion of a metallic collar by suppressing electrical contact between the outer circumference of the metallic collar and the inner circumferential surface of a prepared hole provided in the CFRP material.

DETAILED DESCRIPTION OF THE EMBODIMENTS

An illustrative embodiment of the present invention will be described in detail below, along with the drawings.

The fastening structure for a CFRP material 10 according to an embodiment of the present invention will be described, based on FIG. 1 and FIG. 2.

Figure 1:
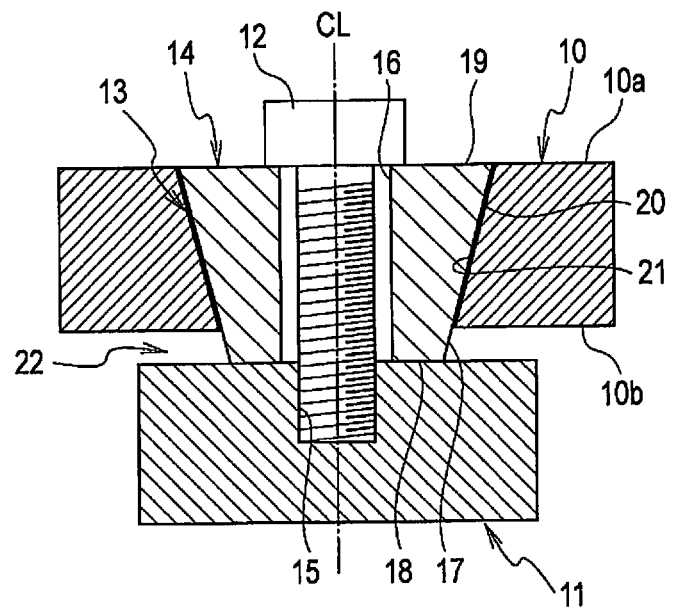
FIG. 1 is a cross-sectional view illustrating a fastening structure for a CFRP material according to an embodiment of the present invention.
Figure 2:
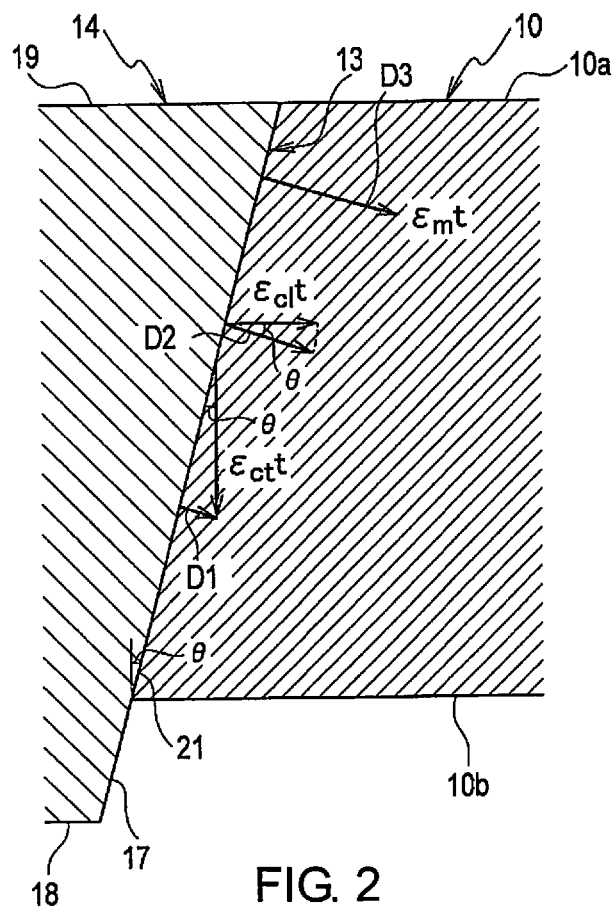
FIG. 2 is a partial, enlarged view of the fastening structure for a CFRP material according to the embodiment of the present invention.

The CFRP material 10 illustrated in FIG. 1 is formed in a flat plate shape; while the entire CFRP material 10 can be formed in a flat plate shape, it is sufficient if at least the fastening portion with the object to be fastened 11 is formed in a flat plate shape. In addition, of the upper and lower sides of the CFRP material 10 in the figure, the upper surface 10a in the figure is referred to as the "front surface" for the sake of convenience, and the lower side surface 10b in the figure is referred to as the "rear surface" for the sake of convenience. The "front surface" and the "rear surface" do not specify the orientation in which the collar 14 is fixed to the CFRP material 10, but to indicate one of the surfaces.

The fastening structure for a CFRP material 10 according to the present embodiment fastens the CFRP material 10, which is the fastening object, and the object to be fastened 11, using a fastener (bolt 12 in the present embodiment), as illustrated in FIG. 1. In the fastening structure for a CFRP material 10 according to the present embodiment, a through-hole (prepared hole) 13 that extends through the front surface 10a and the rear surface 10b is formed in the CFRP material 10, and a metallic collar (metal collar) 14 formed in a tubular shape is inserted in the through-hole 13 to be mounted. Then, the CFRP material 10 and the object to be fastened 11 are fastened by screwing the bolt 12 into a bolt hole 15 provided in the object to be fastened 11, after inserting the bolt 12 through the collar 14, in a state in which the object to be fastened 11 is superposed on the collar 14.

The CFRP material 10 can be applied to vehicle components, such as a hood (bonnet), door panel, bumper, trunk lid, rear tailgate, fender panel, side body panel, and a roof panel. In addition, the CFRP material 10 is not limited to vehicle components, and can be applied to various component members.

The CFRP material 10 can be molded using well-known methods, such as the hot press method and the autoclave molding method. Specifically, for example, a prepreg in which matrix resin is impregnated into a fiber material is prepared for each layer in advance, a predetermined number of sheets obtained by cutting the prepreg into predetermined shapes are stacked, and then pressed and heated in a heating press or an autoclave, to thereby mold the CFRP material 10. In addition, The CFRP material 10 can be molded by a method in which a fiber preform, wherein each fiber material is arranged in a predetermined orientation direction, is sealed in a metal mold, and matrix resin is pressure injected in the metal mold (resin transfer molding method).

The matrix resin is not particularly limited and examples include well-known thermosetting resins and thermoplastic resins, such as epoxy resin, phenol resin, unsaturated polyester resin, vinyl ester resin, polyimide resin, polycarbonate resin, polyamide resin, and polyphenylene sulfide (PPS) resin. In addition, the carbon fiber that constitutes the fiber material is not particularly limited and examples include PAN-type carbon fiber, pitch-type carbon fiber, and rayon-type carbon fiber.

The inner circumference of the metallic collar 14 has a bolt insertion hole 16 into which the bolt 12 can be inserted. Additionally, the outer circumference of the metallic collar 14 has a tapered portion 17 that is inclined with respect to the center axis CL of the collar 14. That is, the collar 14 has a tapered shape in which the end on one side and the end on the other side in the center axis CL direction have different outer diameters. The collar 14 is formed in a truncated cone shape or a truncated pyramid shape as a whole, in which a first planar portion 18, to which the object to be fastened 11 comes in contact, is formed at the small-diameter end, and a second planar portion 19, to which the head of the bolt 12 comes into contact, is formed at the large-diameter end.

On the other hand, the inner circumferential surface of the through-hole 13 of the CFRP material 10 comprises an abutting portion 21 that comes into contact with the tapered portion 17 of the collar 14 via an electrically insulating adhesive 20. That is, the through-hole 13 has a tapered shape in which the end on the front surface 10a side and the end on the rear surface 10b side of the CFRP material 10 have different inner diameters. The abutting portion 21 (through-hole 13) of the CFRP material 10 as a whole is formed into a conical or pyramidal hole, and an adhesive layer 20 is interposed between the abutting portion 21 of the CFRP material 10 and the tapered portion 17 of the collar 14 around the entire perimeter.

In the fastening structure for a CFRP material 10 according to the present embodiment, the end of the collar 14 on the object to be fastened 11 side (small-diameter end) protrudes from a surface, either from the front surface 10a or the rear surface 10b of the CFRP material 10, that opposes the object to be fastened 11, toward the object to be fastened 11, and the object to be fastened 11 is spaced away from the CFRP material 10, by causing the object to be fastened 11 to come into contact with the protruding end of the collar 14. That is, an appropriate gap 22 is provided between the CFRP material 10 and the object to be fastened 11, such that the CFRP material 10 and the object to be fastened 11 will not interfere with each other when the CFRP material 10 thermally expands in the thickness direction. In addition, the tapered portion 17 of the collar 14 and the abutting portion 21 of the CFRP material 10 are formed such that a cross section that passes through the center axis CL of the collar 14 has a fan shape, in which the distance in the radial direction that is orthogonal to the center axis CL gradually increases when moving away from the object to be fastened 11.

The adhesive 20 may be any that has electrical insulating properties; for example an epoxy resin-based adhesive or a urethane resin-based adhesive may be used. In addition, the adhesive 20 may be a thermosetting adhesive or a thermoplastic adhesive.

The material of the object to be fastened 11 is not particularly limited, and a metal material, a resin material, or the like, may be used. The material of the bolt 12 (fastener) is also not particularly limited, and a metal material, a resin material, or the like, may be used. In addition, the fastener that is used to fasten the CFRP material 10 and the object to be fastened 11 is not particularly limited to a bolt 12; for example, a combination of a bolt and a nut, a pin, a rivet, a tapping bolt, or a stud bolt can be used.

Next, the method to determine the tilt angle (taper angle) of the tapered portion 17 of the collar 14 and the abutting portion 21 of the CFRP material 10 with respect to the center axis CL of the collar 14 will be described, based on FIG. 2. In FIG. 2, the adhesive layer made of the adhesive 20 is omitted for the sake of simplifying the illustration.

When the displacement of the CFRP material 10 in the direction perpendicular to the surface of the abutting portion 21 due to thermal deformation (thermal expansion or thermal contraction) accompanying temperature changes and the displacement of the collar 14 in the direction perpendicular to the surface of the tapered portion 17 satisfy the relationship shown in the following formula (1), the vertical distance between the surface of the tapered portion 17 and the surface of the abutting portion 21 (thickness of the adhesive layer made of the adhesive 20) is maintained constant.

$$(\varepsilon_{ct} \sin \theta + \varepsilon_{cl} \cos \theta)t = \varepsilon_m t \tag{1}$$

In formula (1), $\varepsilon_{ct}$ is the thermal expansion coefficient of the CFRP material in a direction perpendicular to the plane thereof (out-of-plane direction), $\varepsilon_{cl}$ is the thermal expansion coefficient of the CFRP material in the in-plane direction thereof, $\varepsilon_m$ is the thermal expansion coefficient of the collar, t is temperature change, and $\theta$ is the tilt angle of the tapered portion.

Here, "direction perpendicular to the plane" and "out-of-plane direction" refer to a direction that is perpendicular to the front surface 10a or the rear surface 10b of the CFRP material 10, and "in-plane direction" refers to a direction that is perpendicular to the direction perpendicular to the plane (out-of-plane direction).

The following formula (2) is derived from formula (1) described above.

$$\varepsilon_{ct} \sin \theta + \varepsilon_{cl} \cos \theta = \varepsilon_m \tag{2}$$

This formula (2) is obtained by dividing both sides of the above formula (1) by the temperature change t.

A measured value or a catalog value of the thermal expansion coefficient of the metal material that constitutes the collar 14 may be used as the thermal expansion coefficient $\varepsilon_m$ of the collar 14. In addition, a measured value or a catalog value of the thermal expansion coefficient of the CFRP that constitutes CFRP material 10 can be used as the thermal expansion coefficients $\varepsilon_{ct}$, $\varepsilon_{cl}$ of the CFRP material 10. The thermal expansion coefficient $\varepsilon_{ct}$ of the CFRP that constitutes the CFRP material 10 in the direction perpendicular to the plane may be substituted by the catalog value of the resin material that constitutes the CFRP material 10, if a useful catalog value does not exist.

By setting the tilt angles of the tapered portion 17 and the abutting portion 21 to an angle θ that satisfies the above-described formula (1) or (2), the vertical distance between the surface of the tapered portion 17 and the surface of the abutting portion 21 is maintained constant, even if the temperature changes. Accordingly, it becomes possible to suppress damage of the adhesive layer 20, caused by deformation due to a difference in the thermal expansion or a difference in the thermal contraction between the CFRP material 10 and the metallic collar 14.

The tilt angle of the tapered portion 17 and the tilt angle of the abutting portion 21 are the same. Additionally, the tilt angle of the tapered portion 17 and the abutting portion 21 is an angle equivalent to an angle θ that satisfies the above-described formula (1) or (2).

In other words, the tilt angles of the tapered portion 17 and the abutting portion 21 are the same as the angle θ at which the displacement (D1+D2) of the CFRP material 10 in the direction perpendicular to the surface of the abutting portion 21 due to thermal deformation accompanying temperature change, is balanced with the displacement D3 of the collar 14 in the direction perpendicular to the surface of the tapered portion 17.

More preferably, the tilt angle of the tapered portion 17 and the abutting portion 21 is set to an angle (acute angle) equal to or less than an angle θ that satisfies the above-described formula (1) or (2). By setting the tilt angle of the tapered portion 17 and the abutting portion 21 to such an angle, the relative displacement between the CFRP material 10 and the metallic collar 14 due to changes in the temperature becomes smaller compared to setting to an angle (obtuse angle) that is larger than an angle θ that satisfies the above-described formula (1) or (2), and the adhesive layer made of the adhesive layer 20 becomes less likely to be damaged.

The action and effects of the present embodiment will be described below.

(1) In the fastening structure for a CFRP material 10 according to the present embodiment, the outer circumference of the metallic collar 14 has a tapered portion 17 that is inclined with respect to the center axis CL of the collar 14. The inner circumferential surface of the through-hole 13 of the CFRP material 10 comprises an abutting portion 21 that comes into contact with the tapered portion 17 of the collar 14 via an electrically insulating adhesive 20. The tilt angles of the tapered portion 17 of the collar 14 and the abutting portion 21 of the CFRP material 10 are the same as the angle at which the displacement of the CFRP material 10 in the direction perpendicular to the surface of the abutting portion 21 due to thermal deformation accompanying temperature change, is balanced with the displacement of the collar 14 in the direction perpendicular to the surface of the tapered portion 17.

It becomes possible to insert the metallic collar 14 into the through-hole 13 without squeezing the adhesive 20 out from the prepared hole (through-hole 13) provided in the CFRP material 10, and to suppress electrical contact between the outer circumference of the metallic collar 14 and the inner circumferential surface of the through-hole 13 of the CFRP material. In addition, by setting the tilt angles of the tapered portion 17 and the abutting portion 21 as described above, the vertical distance between the surface of the tapered portion 17 and the surface of the abutting portion 21 is maintained constant, even if the temperature changes. Accordingly, it becomes possible to suppress damage of the adhesive layer made of the adhesive 20 caused by deformation due to a difference in the thermal expansion or a difference in the thermal contraction between the CFRP material 10 and the metallic collar 14. Therefore, according to the fastening structure for a CFRP material 10 of the present invention, it is possible to suppress electric corrosion of a metallic collar 14 by suppressing electrical contact between the outer circumference of the metallic collar 14 and the inner circumferential surface of a through-hole 13 of the CFRP material 10.

(2) The end of the collar 14 on the object to be fastened 11 side protrudes from a surface, either the front surface 10*a* or the rear surface 10*b* of the CFRP material 10, that opposes the object to be fastened 11, toward the object to be fastened 11, and the object to be fastened 11 is spaced away from the CFRP material 10, by bringing the object to be fastened 11 into contact with the protruding end of the collar 14.

Since a gap 22 is provided between the CFRP material 10, which is the fastening object, and the object to be fastened 11, it is possible to suppress interference between the CFRP material 10 and the object to be fastened 11, even when the CFRP material 10 thermally expands in the thickness direction.

(3) The tapered portion 17 of the collar 14 and the abutting portion 21 of the CFRP material 10 are formed such that a cross section that passes through the center axis CL of the collar 14 has a fan shape, in which the distance in the radial direction orthogonal to the center axis CL is gradually increased when moving away from the object to be fastened 11.

It is possible to prevent the metallic collar 14 from falling off the CFRP material 10 together with the object to be fastened 11, even when, for example, the bonding strength by the adhesive 20 is reduced.

The contents of the present invention have been explained above in accordance with the illustrative embodiment, but the present invention is not limited by the description, and it is obvious to a person skilled in the art that various modifications and improvements are possible.

The invention claimed is:

1. A fastening structure that is fastened to an object, the fastening structure comprising:
   a carbon fiber-reinforced resin material having a through-hole extending through a front surface and a rear surface of the carbon fiber-reinforced resin material;
   a metallic collar having a tubular shape, the metallic collar being disposed in the through-hole of the carbon fiber-reinforced resin material;
   a fastener extending through the collar in a state in which the object to be fastened is superposed on the collar and fastened to the fastener,
   the metallic collar having an outer circumference with a tapered portion that is inclined with respect to a center axis of the collar,
   the through-hole of the carbon fiber-reinforced resin material having an inner circumferential surface with an abutting portion that contacts the tapered portion of the collar via an electrically insulating adhesive, tilt angles of the tapered portion of the collar and the abutting portion of the carbon fiber-reinforced resin material are the same as an angle at which a displacement of the carbon fiber-reinforced resin material in a direction perpendicular to a surface of the abutting portion due to thermal deformation accompanying a temperature change is balanced with the displacement of the collar in a direction perpendicular to a surface of the tapered portion.

2. The fastening structure according to claim 1, wherein the collar has a protruding end on a fastened object side that protrudes toward the object to be fastened from a surface of the carbon fiber-reinforced resin material that is opposed to the object to be fastened, such that the object to be fastened is spaced away from the carbon fiber-reinforced resin material by the protruding end of the collar abutting the object to be fastened to the protruding end of the collar.

3. The fastening structure according to claim 2, wherein the tapered portion of the collar and the abutting portion of the carbon fiber-reinforced resin material are formed such that a cross section passing through a center axis of the collar has a fan shape, in which a distance in a radial direction orthogonal to the center axis gradually increases as the tapered portion moves in a direction away from the object to be fastened.

4. The fastening structure according to claim 1, wherein the tapered portion of the collar and the abutting portion of the carbon fiber-reinforced resin material are formed such that a cross section passing through a center axis of the collar has a fan shape, in which a distance in a radial direction orthogonal to the center axis gradually increases as the tapered portion moves in a direction away from the object to be fastened.

* * * * *